(12) United States Patent
Bokvist et al.

(10) Patent No.: US 11,228,129 B2
(45) Date of Patent: Jan. 18, 2022

(54) ELECTRICAL COUPLING FOR A CAMERA DEVICE

(71) Applicant: Axis AB, Lund (SE)

(72) Inventors: Malte Bokvist, Lund (SE); Jöns Danelius, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/080,990

(22) Filed: Oct. 27, 2020

(65) Prior Publication Data

US 2021/0126395 A1    Apr. 29, 2021

(30) Foreign Application Priority Data

Oct. 29, 2019 (EP) ..................................... 19205880

(51) Int. Cl.
| | |
|---|---|
| *H01R 13/24* | (2006.01) |
| *H01R 13/52* | (2006.01) |
| *H01R 13/631* | (2006.01) |
| *H04N 5/232* | (2006.01) |
| *H01R 13/639* | (2006.01) |

(52) U.S. Cl.
CPC ..... *H01R 13/2471* (2013.01); *H01R 13/5219* (2013.01); *H01R 13/631* (2013.01); *H04N 5/232* (2013.01); *H01R 13/639* (2013.01); *H01R 2201/18* (2013.01)

(58) Field of Classification Search
CPC ............ H01R 2201/18; H01R 13/5219; H01R 13/639; H01R 13/631; H01R 13/2471; H04N 5/232
See application file for complete search history.

(56) References Cited

U.S. PATENT DOCUMENTS 10,283,903 B2 *   5/2019   Yamanaka ........... H01R 13/506
2009/0208168 A1 *   8/2009   Ishikawa .............. H01R 13/639
385/14

(Continued)

FOREIGN PATENT DOCUMENTS

| CN | 110336160 A | 10/2019 |
|---|---|---|
| EP | 3462550 A1 | 4/2019 |

OTHER PUBLICATIONS

Extended European Search Report dated Mar. 20, 2020 for the European Patent Application No. 19205880.8.

*Primary Examiner* — Briggitte R. Hammond
(74) *Attorney, Agent, or Firm* — Volpe Koenig

(57) ABSTRACT

An electrical coupling transfers electrical signals between a camera head and a cable and comprises a first part associated with the camera head and a second part associated with the cable and connectable to the first part. The coupling establishes contact between connectors of the first and second parts. The first part comprises a first connection position for reception of the second part, and a second connection position for reception of the second part. The connectors of the first and second parts comprise dot shaped connectors and elongated connectors. One of the first and second parts comprise the dot shaped connectors, and the other one comprises the elongated connectors. Each dot shaped connector is associated with one of the elongated connectors, and the connectors are arranged such that each dot shaped connector connects with an associated elongated connector in both the first connection position and the second connection position.

14 Claims, 7 Drawing Sheets

(56) References Cited

U.S. PATENT DOCUMENTS

| | | |
|---|---|---|
| 2014/0329416 A1 | 11/2014 | Golko et al. |
| 2017/0155809 A1 | 6/2017 | Sauer et al. |
| 2017/0179660 A1 | 6/2017 | Saunders et al. |
| 2019/0092250 A1 | 3/2019 | McElroy et al. |

* cited by examiner

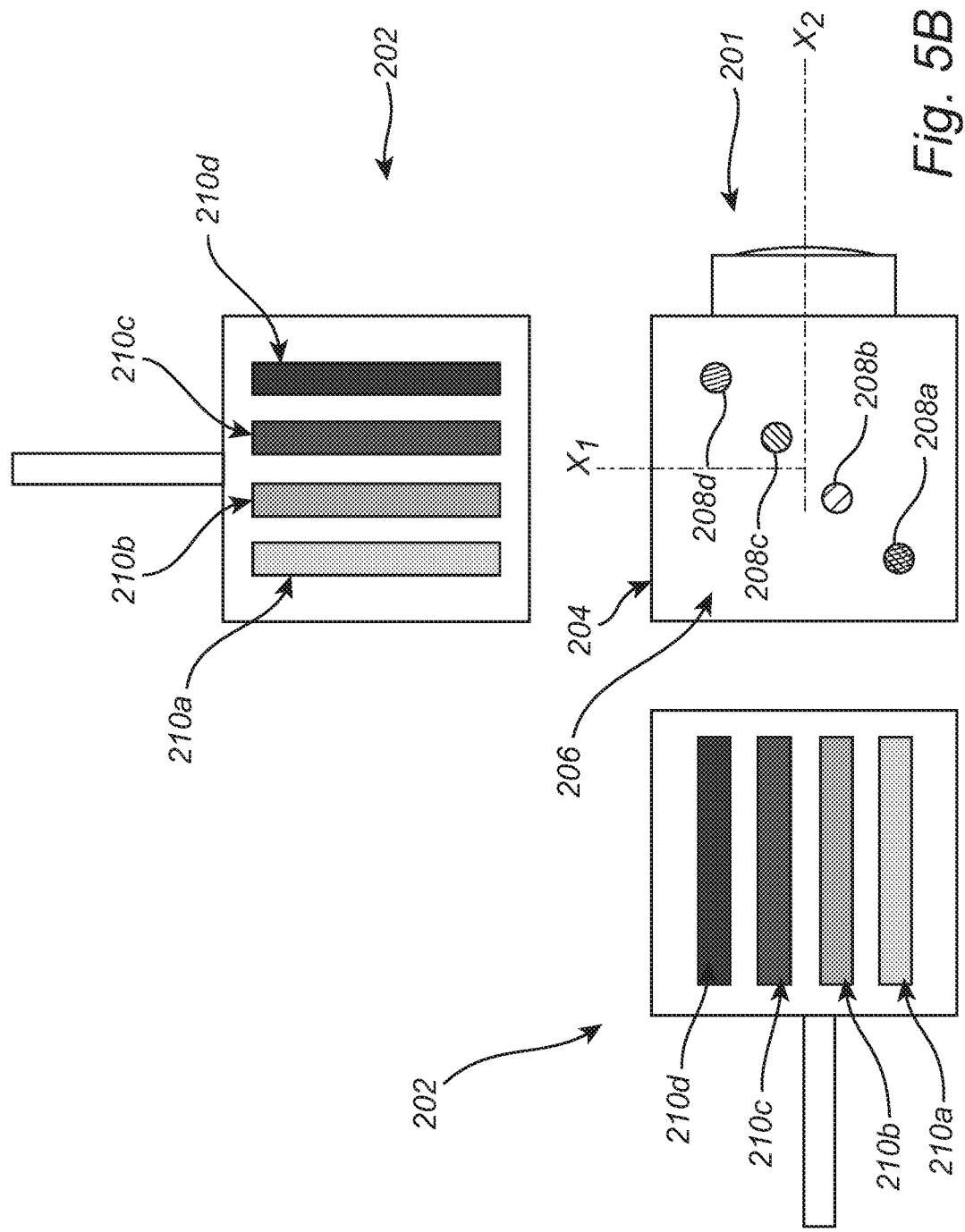

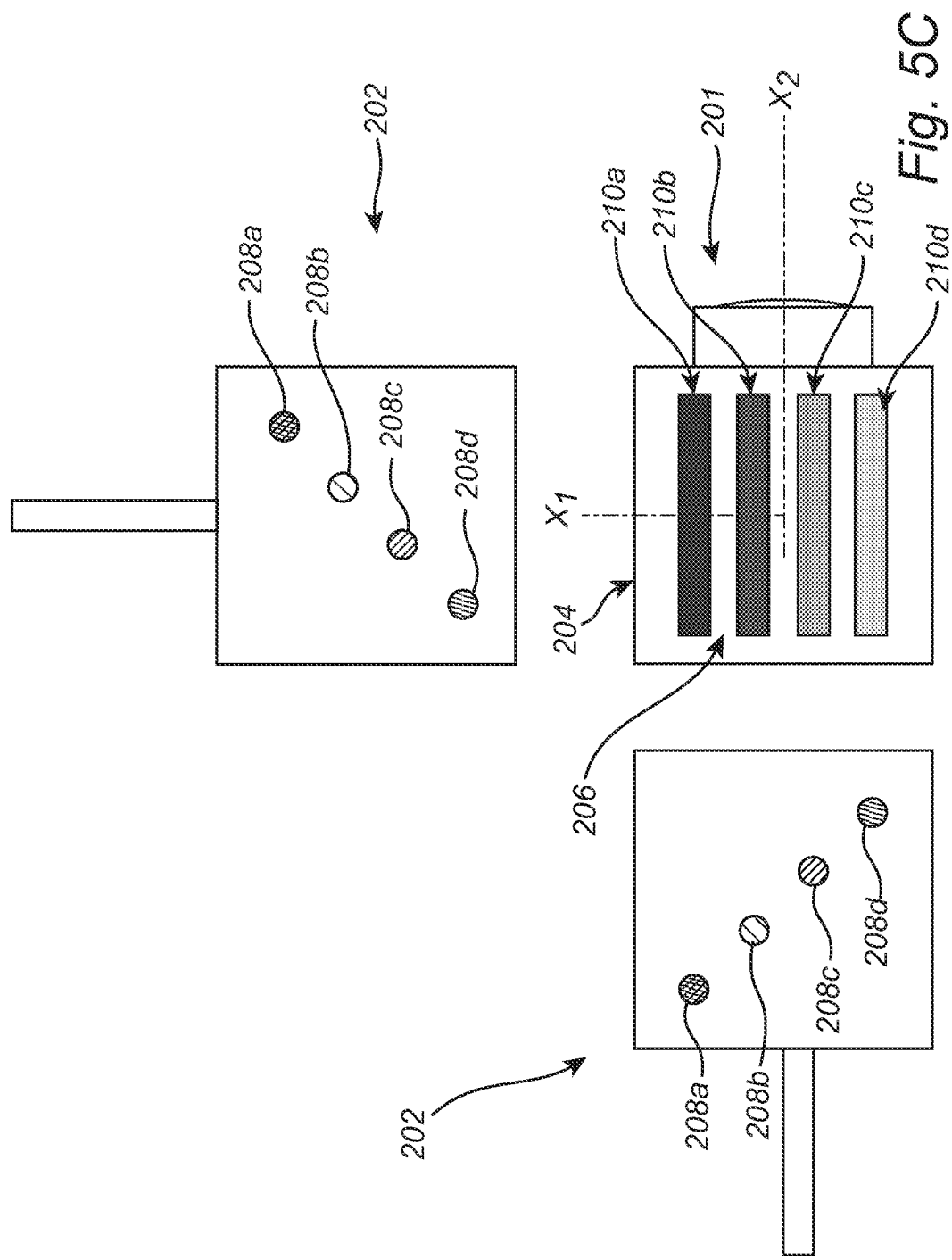

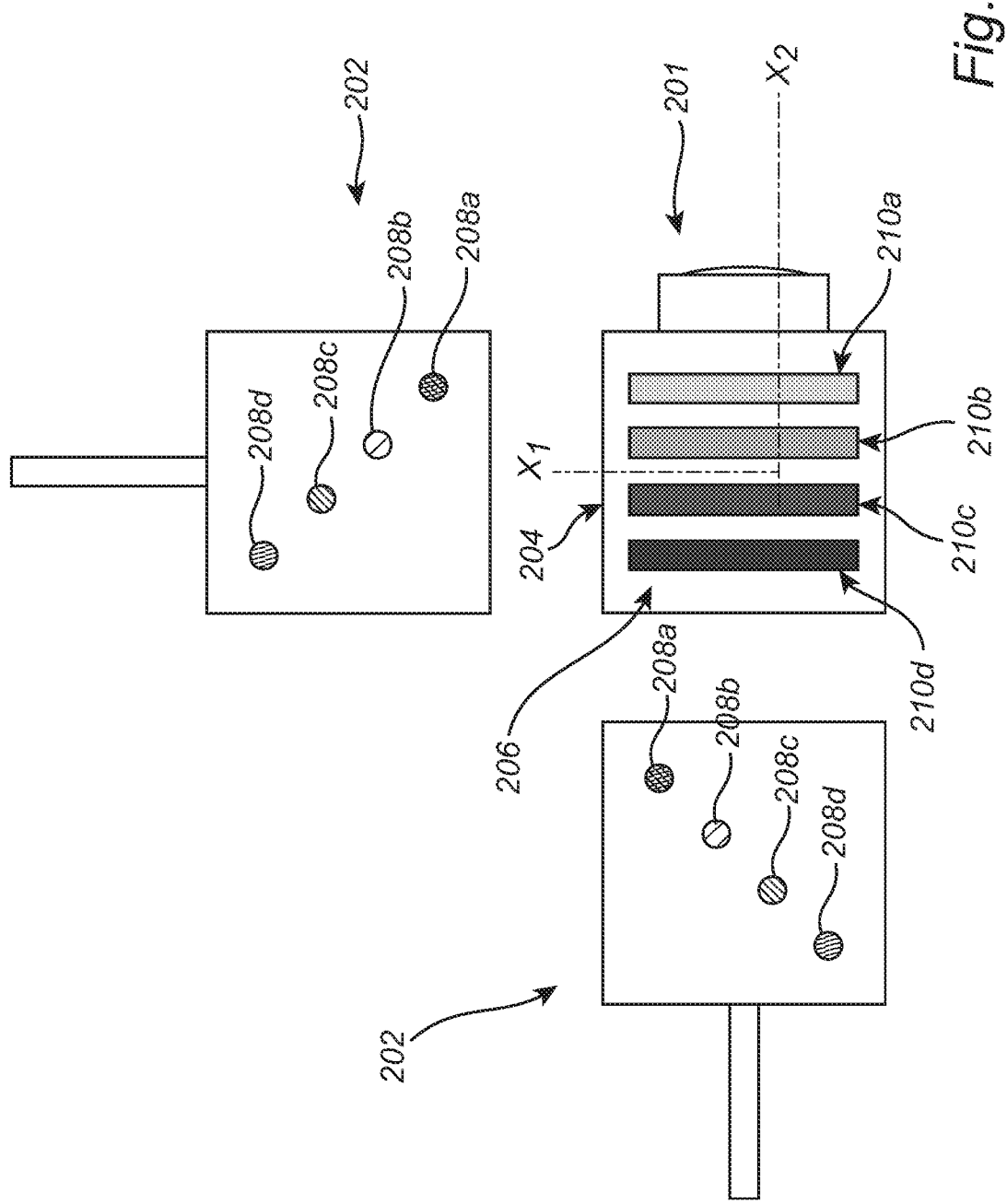

ELECTRICAL COUPLING FOR A CAMERA DEVICE

FIELD

The invention relates to an electrical coupling for transferring electrical signals between a camera head and a cable; and also relates to a camera device comprising such an electrical coupling.

BACKGROUND ART

Camera devices such as network cameras may be used in many different situations, both indoors and outdoors.

A cable is normally connected to the camera device for signal transfer.

A specific type of camera device is referred to as a modular camera which normally comprises two separate parts; a sensor unit and a main unit connected to the senor unit via cable.

The sensor unit may comprise a lens holder and a lens member releasably supported by the lens holder. An image sensor may be arranged in the lens holder. Such a configuration thus enables switch of lens member type.

Modular cameras are often small-sized, and it is often desirous to configure the modular camera such that it does not take up much space when installed.

The cable is normally connected to a camera head of the camera device. For a modular camera where the camera head is formed by the lens holder and the lens member, the cable may be connected to the lens holder comprising the image sensor.

The connection of the cable to the camera head may add installation space, especially in the cable extension direction.

CN110336160A discloses an adapter for an image pickup apparatus. The adapter is connected to a wire and may comprise three adapter plates for connection to the image pickup apparatus.

SUMMARY

In view of that stated above, providing an improved electrical coupling for transferring electrical signals between a camera head and a cable would be beneficial. Additionally, providing such an electrical coupling mitigates problems associated with adding installation space when connecting the cable to the camera head.

Achieving these benefits will be evident from the following description. An electrical coupling and a camera device are provided. Preferred embodiments of the electrical coupling will be evident from the description.

According to a first aspect, an electrical coupling for transferring electrical signals between a camera head and a cable is provided, comprising: a first coupling part associated with the camera head and a second coupling part associated with the cable and connectable to the first coupling part for establishing contact between connectors of the first and second coupling part. The first coupling part comprises a first connection position configured for reception of the second coupling part. The first coupling part comprises a second connection position configured for reception of the second coupling part. The connectors of the first and second coupling part comprises dot shaped connectors and elongated connectors. One of the first coupling part and the second coupling part comprises the dot shaped connectors, and the other one of the first coupling part and the second coupling part comprises the elongated connectors. Each dot shaped connector is associated with a unique one of the elongated connectors. The connectors are arranged such that each dot shaped connector connects with the unique associated elongated connector in both the first connection position and the second connection position.

A versatile electrical coupling is hereby provided enabling connection of the camera head of a camera device to another part of the camera device by means of a cable. The electrical coupling allows for connection in two connection positions, which may be mutual perpendicular, thus facilitating installation of a camera device comprising the described electrical coupling. The installation is further facilitated by the provision of the electrical coupling having a first and a second connection position without affecting the quality of the signal transfer. Hence, a compact camera arrangement may be provided. Thus, the camera device may be installed such that the cable connects to the camera head where there is enough space for a facilitated installation.

The first connection position may be configured for reception of the second coupling part by insertion along a first axis associated with the first coupling part. The second connection position may be configured for reception of the second coupling part by insertion along a second axis associated with the first coupling part, the second axis being perpendicular to the first axis The connectors of the first coupling part may be arranged in a wall section of the first coupling part facing the connectors of the second coupling part when the second coupling part is arranged in the first or second connection position. This may provide a compact solution of connecting two coupling parts. By arranging the connectors of the first coupling part in the wall section facing the connectors of the second coupling part when this is arranged in the first or second connection position, it is ensured that the connectors of the first coupling part are accessible for the connectors of the second coupling part when connected to the first coupling part. The configuration of the connectors of the first and second coupling part also facilitates change of camera head or cable.

Each elongated connector may have a straight extension. The elongated connectors may extend in parallel. The elongated connectors may all have the same length and/or width. Alternatively, the elongated connectors may have different length and/or width. Especially, the length of the elongated connectors may be different.

The first coupling part may comprise the elongated connectors. All of the elongated connectors may extend in parallel with either the first axis X1 or the second axis X2. By suitable arrangement of the dot shaped connectors of the second coupling part, this configuration makes it possible to ensure that each dot shaped connector makes contact with the associated unique one of the elongated connectors in both the first and second connection position.

The first coupling part may comprise the dot shaped connectors, and the elongated connectors of the second coupling part may in this case have an extension in parallel with the first axis X1 when the second coupling part is arranged in the first connection position and in parallel with the second axis X2 when the second coupling part is arranged in the second connection position. Hereby it may be ensured that each elongated connector only makes contact with the associated dot shaped connector during connection both in the first and in the second connection position. This configuration may thus eliminate the risk of any short circuiting occurring during connection when some of the dot shaped connectors and associated elongated connectors are arranged for power transfer. Moreover, the installation of the camera may be facilitated.

The elongated connectors of the second coupling part may alternatively have an extension perpendicular to the first axis X1 when the second coupling part is arranged in the first connection position and perpendicular to the second axis X2 when the second coupling part is arranged in the second connection position. By suitable configuration of the dot shaped connectors of the first coupling part, this configuration makes it possible to ensure that each dot shaped connector makes contact with the associated unique one of the elongated connectors in both the first and second connection position.

The dot shaped connectors may be arranged in an array which in the assembled state of the connector may be arranged in 45 degrees to the first axis X1 and the second axis X2. This configuration may prevent any dot shaped connector from mistakenly making contact with a non-associated elongated connector in the first or second connection position.

Each pair of dot shaped connector and associated elongated connector may be arranged for one of power, ground and data transfer. Thus, the electrical coupling may be arranged for electrical signals in the form of power, ground and data.

The dot shaped connectors and associated elongated connectors may comprise one pair of connectors arranged for power transfer, which one pair comprises a connector being the last to enter the first connection position or the second connection position when the second coupling part is connected to the first coupling part. Hereby it may be ensured that each connector of the pair of connectors for power transfer never makes contact with a non-associated connector during connection, thereby eliminating the risk for short circuiting.

The connector may further comprise a seal enclosing the connectors. The seal may prevent any water intrusion, such as for example rain splashes, from entering the coupling and reaching the connectors. The sealing may prevent any dirt or moist to reach the connectors of the first coupling part and the second coupling part when connected. Thus, a connector is provided that may reduce the risk of malfunction due to particles disrupting the signal transfer.

The dot shaped connectors may be spring-loaded pins, such as pogo pins. The spring-loaded pin may provide the camera device with a compact electronic connection to transfer electrical signals between the first coupling part and the second coupling part. Thus, the camera device may have a compact connection enabling reliable electrical signal transfer between the first and second coupling part without any use of cables. The elongated connectors may be spring-loaded.

The elongated connectors may have a non-uniform extension. Each elongated connector may have a length sufficient for making contact with the associated dot shaped connector in the first connection position and the second connection position. Hereby, the length of a single elongated connector may be minimized which may enable efficient use of material and also mitigating problems associated with signal echoes in connection with data signal transfer.

According to a second aspect there is provided a camera device comprising an electrical coupling as described above. The above-mentioned features and advantages, when applicable, apply to this second aspect as well. It is noted that the teachings relate to all possible combinations of features recited in the claims.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages, will be better understood through the following illustrative and non-limiting detailed description of preferred embodiments, with reference to the appended drawings, where the same reference numerals will be used for similar elements, wherein:

FIG. 5B is a schematic side view illustrating a second configuration of the electrical coupling.

FIG. 5C is a schematic side view illustrating a third configuration of the electrical coupling.

FIG. 5D is a schematic side view illustrating a fourth configuration of the electrical coupling.

DESCRIPTION OF EMBODIMENTS

The present teachings will now be described more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and fully convey the scope of the claims to the skilled person.

It will be appreciated that the present teachings are not limited to the embodiments shown. Several modifications and variations are thus conceivable within the scope which thus is defined by the description and by the appended claims.

Figure 1:
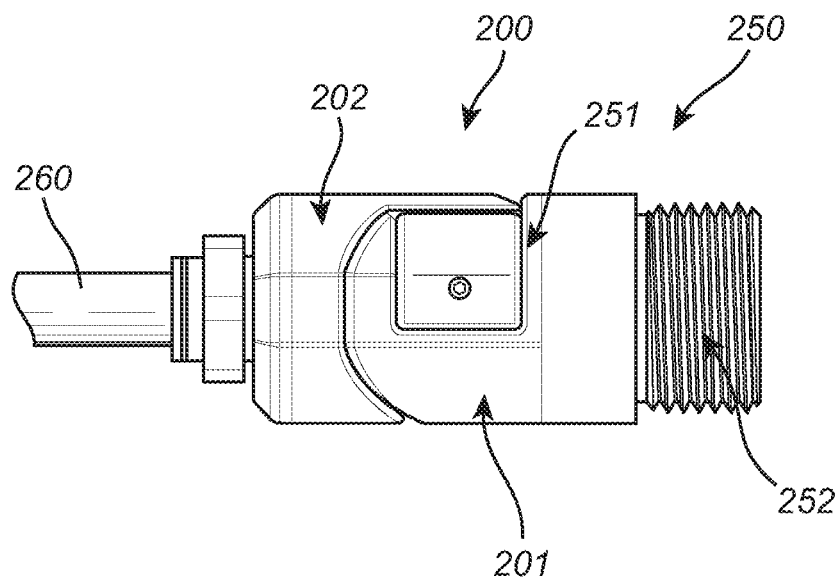
FIG. 1 is a perspective view illustrating an assembled camera device.

FIG. 1 shows a camera device 200 comprising a camera head 250 and a cable 260 connected thereto.

The camera device 200 in FIG. 1 is of a modular camera type comprising a sensor unit having a front chassis 251 releasably supporting a lens holder 252, wherein the front chassis 251 and the lens holder 252 form the camera head 250 of the camera device 200. Such a modular camera may also comprise a not shown main unit.

The camera device 200 further comprises an electrical coupling for transferring signals between the camera head 250 and a cable 260. The cable 206 may transfer signals to the main unit. In other words, the electrical coupling may transfer signals between the camera head 250 and the main unit via the cable 260. In the shown figure, the electrical coupling comprises a first coupling part 201 integrally formed with the front chassis 251.

The electrical coupling further comprises a second coupling part 202 which is releasably connected to the first coupling part 201. The cable 260 is attached to the second coupling part 202. In some embodiments, the second coupling part 202 may be formed integrally with the cable 260.

The camera device may for example be of a Fisheye, Pinhole, Varifocal, IR type camera device.

Figure 2:
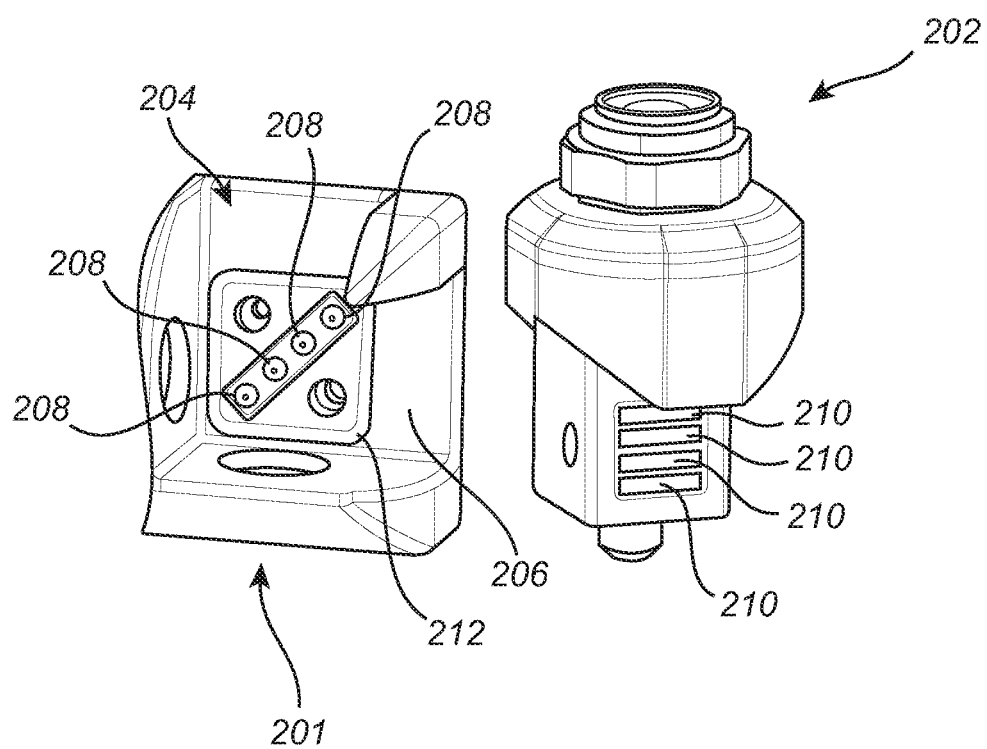
FIG. 2 is a perspective view illustrating a first and a second coupling part of an electrical coupling for transferring electrical signals between a camera head and a cable in a non-assembled state.

The first coupling part 201 and the second coupling part 202 of the electrical coupling is illustrated in FIG. 2. As evident from the description above and FIG. 1, the first coupling part 201 is associated with the camera head 250 and the second coupling part 202 is associated with the cable 260. For a modular camera, the cable 260 may be used for connecting the sensor unit to the main unit.

The first coupling part 201 and the second coupling part 202 each comprises connectors. When in an assembled state, the connectors of the first and second coupling parts 201, 202 make contact such that electrical signals may be transferred between the camera head 250 and the cable 260. The electrical signals may be transferred between the camera head 250 and the main unit via the cable 260.

The electrical signals transferred between the camera head 250 and the cable 260 may be in the form of image data obtained by the camera head 250. The electrical signals transferred between the camera head 250 and the cable 260 may be used for powering and controlling the camera device 200. The electrical signal may be in the form of power/ground feed to the camera head 250 and may also comprise control data pertaining to image quality, and may thus for example trigger a change of focus aiming at gaining a higher image quality. The signal may comprise data pertaining to instructions regarding turning on/off a light diode or a trigger to start any action.

As evident from the figure, the electrical coupling may further comprise a seal 212. In the shown embodiment, the seal 212 is arranged on the first coupling part 201 and encloses the connectors arranged thereon. In an assembled state, i.e. when the first coupling part 201 is releasably connected to the second coupling part 202 such that connectors of the first and second coupling part 201, 202 engage each other for electrical signal transfer, the seal 212 is arranged to enclose and seal off the connectors. The seal 212 may prevent any dirt or other particles and moisture from reaching the connectors when the electrical coupling is in an assembled state. The seal may prevent any water intrusion such as for example from rain splash from entering the coupling and reaching the electrical connectors.

The connectors are in the form of a plurality of dot shaped or discrete connectors 208 and a plurality of elongated connectors 210. One of the first and second coupling part 201, 202 comprises the dot shaped connectors 208 and the other of the first and second coupling part 201, 202 comprises the elongated connectors 210. In the shown embodiment the first coupling part 201 comprises four dot shaped connectors 208, and the second coupling part 202 comprises four elongated connectors 210.

Each dot shaped connector 208 is associated with a unique one of the elongated connectors 210.

The dot shaped or discrete connectors 208 may be spring-loaded pins. The spring-loaded pins may be pogo pins.

The elongated connector 210 may be contact plates.

Figure 3:
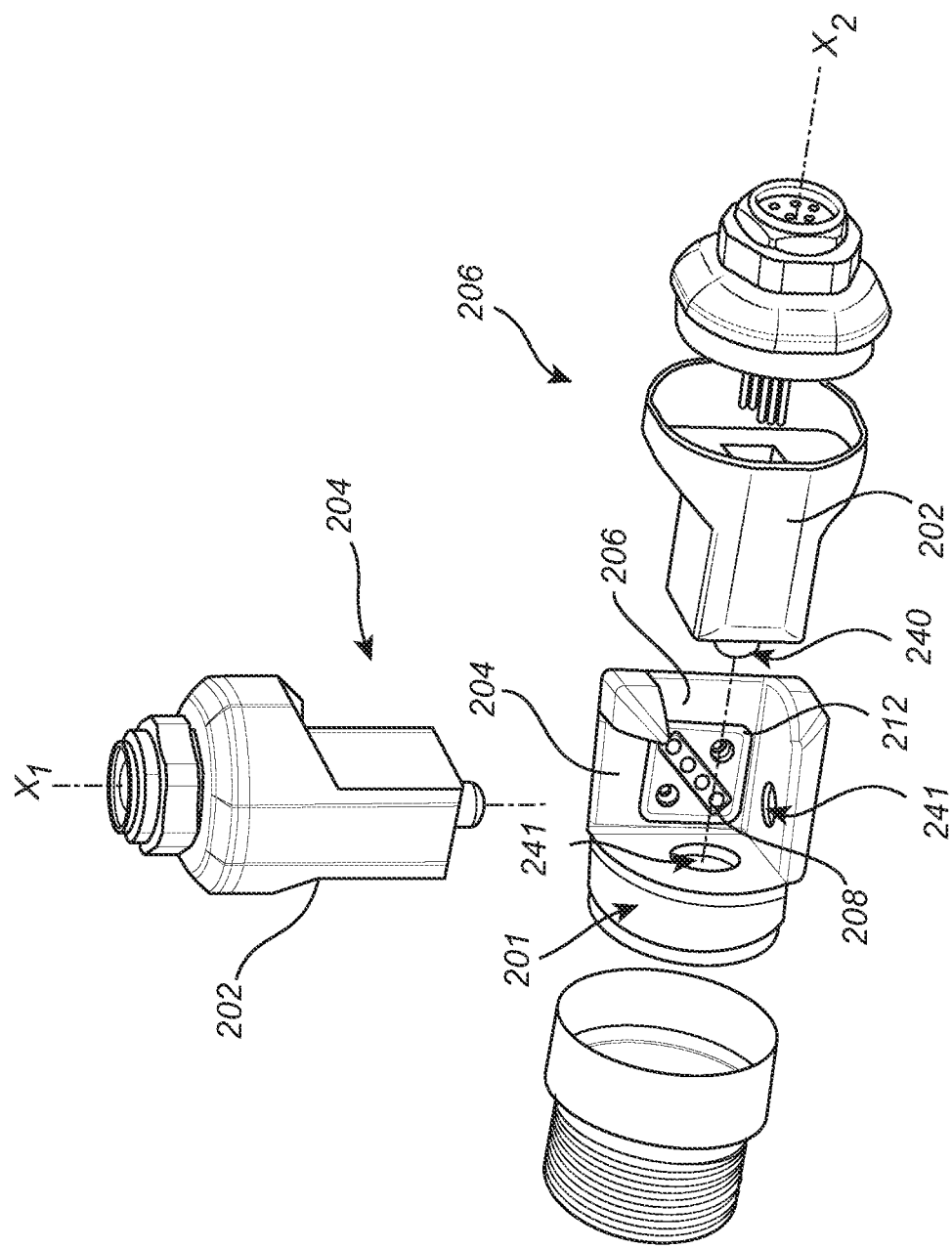
FIG. 3 is a perspective view illustrating a first and second connection position of the electrical coupling shown in FIG. 2.

As evident from FIG. 3, illustrating the camera device 200 in exploded view, the first coupling part 201 comprises or defines a first connection position 204 and a second connection position 206 enabling connection of the second coupling part 202 to the first coupling part 201 in two different orientations. The first connection position 204 is configured for reception of the second coupling part 202 by insertion along a first axis X1 associated with the first coupling part 201. The second connection position 206 is configured for reception of the second coupling part 202 by insertion along a second axis X2 associated with the first coupling part 201. It is to be noted that that the first axis X1, and the second axis X2 need not be aligned with the optical axis of the camera device.

In the shown embodiment, the first axis X1 is perpendicular to the second axis X2, and the electrical coupling thus enables selective arrangement of the cable (not shown) extending from the second coupling part 202 in two mutual perpendicular orientations. By providing the first and second connection position 204, 206 the cable may thus be connected to the camera head where there is available space such that the cable is not bent, nor any external forces is acting to the cable.

When the second coupling part 202 is inserted into the first coupling part 201, in the first connection position 204 or the second connection position 206, contact is established between each dot shaped connector 208 and the associated elongated connector 210. Thus, the connectors are arranged such that, in the assembled state of the electrical coupling, each dot shaped connector only makes contact with or engage the associated unique elongated connector.

The connectors of the first coupling part 201 may be arranged in a wall section of the first coupling part 201. The connectors of the first coupling part 201 are in the shown embodiment facing and engaging the connectors of the second coupling part 202, when the second coupling part 202 is arranged in the first or second connection position 204, 206.

Each pair of dot shaped connector 208 and associated elongated connector 210 may be arranged for one of power, ground and data signal transfer.

The data signal transfer may be data signals pertaining to a captured image or video sequence.

The elongated connectors 210 extend in parallel.

The elongated connectors 210 may all have the same length and/or width. Alternatively, the elongated connectors 210 may have different length and/or width.

The first coupling part 201 may comprise the elongated connectors 210, which may extend in parallel with the first axis X1 or the second axis X2.

The second coupling part 202 may comprise the elongated connectors 210. In such a case, the elongated connectors 210 may have an extension in parallel with the first axis X1 when the second coupling part 202 is arranged in the first connection position 204 and in parallel with the second axis X2 when the second coupling part 202 is arranged in the second connection position 206. Alternatively, the elongated connectors 210 may have an extension perpendicular to the first axis X1 when the second coupling part 202 is arranged in the first connection position 204 and perpendicular to the second axis X2 when the second coupling part 202 is arranged in the second connection position 206.

The dot shaped connectors 208 may be arranged in an array which in the assembled state of the electrical coupling is arranged in 45 degrees to the first axis X1 and the second axis X2.

The dot shaped connectors 208 and associated elongated connectors 210 may comprise one pair arranged for power transfer, which one pair comprises a connector being the last to enter the first connection position 204 or the second connection position 206 when the second coupling part 202 is connected to the first coupling part 201. This configuration may reduce the risk of any short circuiting of the electrical coupling.

In some embodiments the electrical coupling comprises a pair of dot shaped connector 208 with associated elongated connector 210 being arranged for grounding.

As illustrated in the shown embodiment, the second coupling part 202 may comprise a protrusion 240 and the first coupling part 201 may comprise a pair of recesses 241 configured for reception of the protrusion 240 when the second coupling part 202 is arranged in the first or second connection position 204, 206. Thus, the protrusion 240 and the recesses 241 form a guide mechanism ensuring that the second coupling part 202 is releasably connected to the first coupling part 201 in a desired manner. With such a configuration, the risk of misaligning the coupling is reduced.

Figure 4:
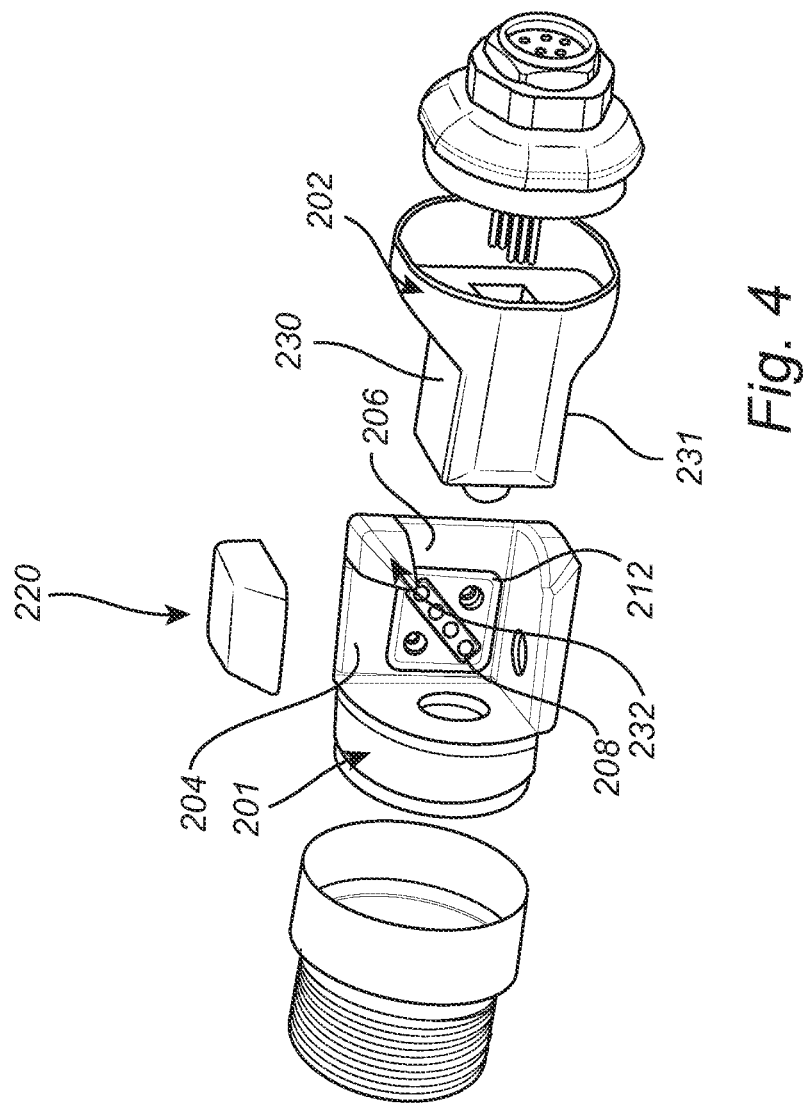
FIG. 4 is a perspective view illustrating a configuration for assembly of the electrical coupling shown in FIG. 2.

As shown in FIG. 4, the electrical coupling may comprise a locking element 220. The second coupling part 202 comprises a first section 230 aligning with the entry to the first connection position 204 when the second coupling part 202 is in the second connection position 260. The second coupling part 202 further comprises a second section 231 arranged to align with the entry to the second connection position 206 when the second coupling part 202 is in the first connection position 204.

The locking element 220 comprises a body arranged to be inserted into the entry of the first or second connection position 204, 206, depending on which connection position is occupied by the second coupling part 202, and placed on and fixed to the first or second section 230, 231 aligned with the entry to the first or second connection position, respectively. The first coupling part 201 further comprises a wall member 232 partly defining the first and second connection position 204, 206. The wall member 232 may aid in guiding the second coupling part 202 when being inserted into the first coupling part 201. Retraction of the second coupling part 202 from the first or second connection position 204, 206 is prevented by the locking element 220 engaging the wall member 232, thereby eliminating the risk of unintentional disconnection of the second coupling part 202 from the first coupling part 201.

In another embodiment, the electrical coupling may comprise a spring-loaded locking element.

Some configurations of the electrical coupling will now be described in more detail with reference to FIGS. 5a-5d. It is to be noted that other configurations are feasible. In the figures, the electrical coupling is shown in a non-assembled state, wherein the second coupling part 202 is illustrated in position for insertion into the first and second connection position, respectively.

Figure 5A:
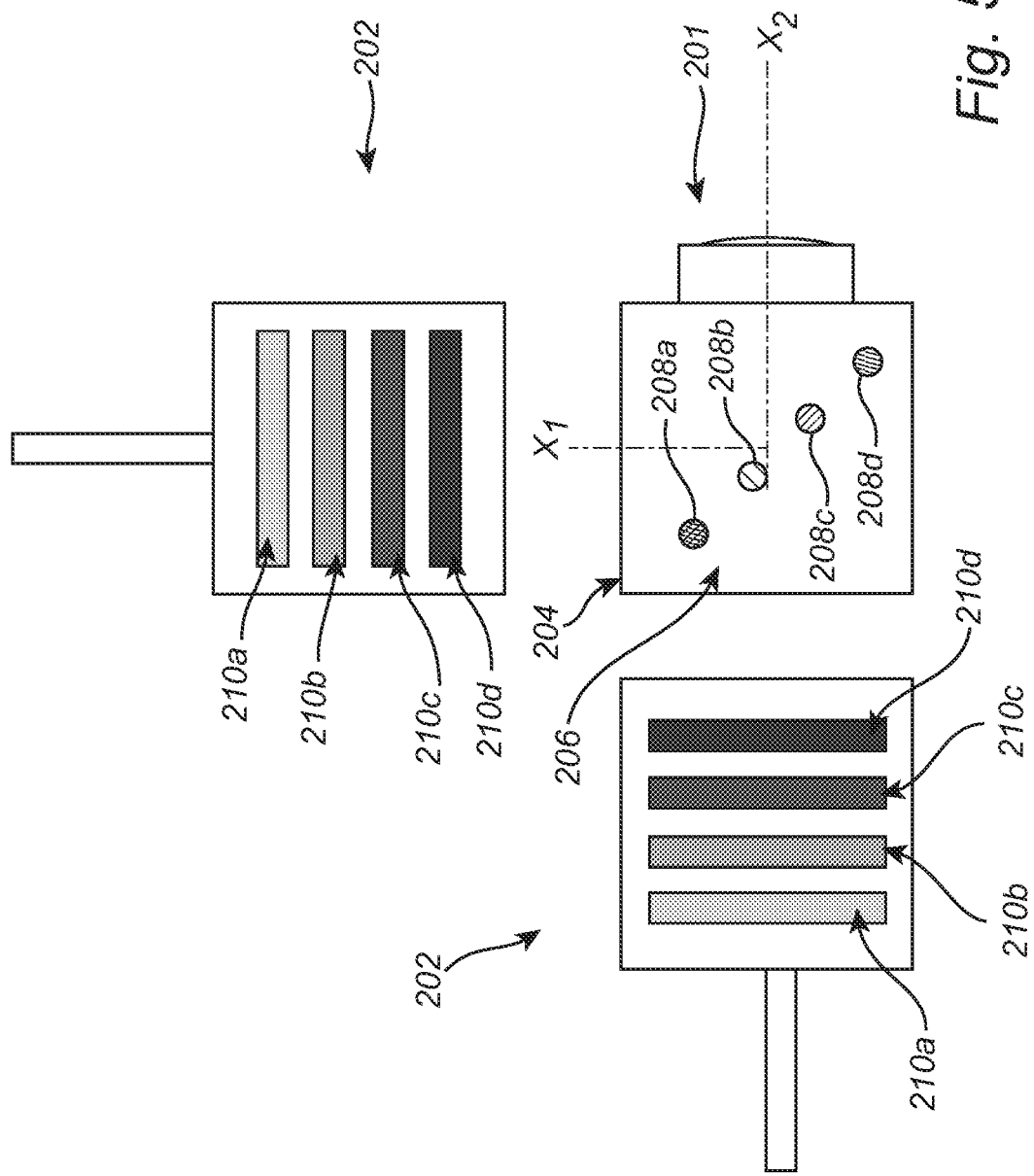
FIG. 5A is a schematic side view illustrating a first configuration of the electrical coupling.

FIG. 5A schematically illustrates an embodiment wherein the second coupling part 202 comprises the elongated connectors 210a-d and the first coupling part 201 comprises the dot shaped connectors 208a-d arranged in array 45 degrees to the first axis X1 and the second axis X2. As is disclosed, the elongated connectors are arranged such that they have an extension perpendicular to the first axis X1 when the second coupling part 202 is arranged in the first connection position 204 and perpendicular to the second axis X2 when the second coupling part 202 is arranged in the second connection position 206.

In the given example, the dot shaped connector 208a and the associated elongated connector 210a form a pair of connectors arranged for power transfer. That pair of connectors comprise the elongated connector 210a which is the last elongated connector to enter the first or the second connection position 204, 206 when the second coupling part 202 is connected to the first coupling part 201, and the elongated connector 210a will not make contact with any other connector while the second coupling part is inserted into the first or second connection position. Thus, the risk for short circuiting when connecting the second coupling part to the first coupling part may be eliminated.

Each one of the dot shaped connectors 208a-d makes contact with the associated elongated connector 210a-d when the second coupling part 202 is connected to the first coupling part 201 in the first connection position 204 or in the second connection position 206.

As evident from the embodiment in FIG. 5B, the elongated connectors 210a-d arranged on the second coupling part may alternatively have an extension parallel to the first axis X1 when the second coupling part 202 is arranged in the first connection position 204 and parallel to the second axis X2 when the second coupling part 202 is arranged in the second connection position 206. The disclosed configuration ensures that each dot shaped connector 208a-d only engages the unique associated elongated connector 210 when the second coupling part 202 in inserted into the first or second connection position 204, 206 of the first coupling part 201. In the disclosed embodiment, any pair of dot shaped connector 208a-d and associated elongated connector 210a-d may thus be arranged for power transfer since there is no risk for short circuiting when connecting the second coupling part 202 to the first coupling part 201.

In the embodiments shown in FIGS. 5c and 5d, the first coupling part 201 comprises the elongated connector 210a-d, and the second coupling part comprises the dot shaped connectors 208a-d. Thus, when the first coupling part 201 comprises the elongated connectors 210a-d, the elongated connectors 210a-d may extend in parallel with either the first axis X1 or the second axis X2.

The person skilled in the art realizes that the present teachings are by no means is limited to the preferred embodiments described above. On the contrary, many modifications and variations are possible within the scope of the appended claims.

Additionally, variations to the disclosed embodiments can be understood and effected by the skilled person in practicing the claims, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An electrical coupling for transferring electrical signals between a camera head and a cable, comprising:
   a first coupling part associated with the camera head and
   a second coupling part associated with the cable and connectable to the first coupling part for establishing contact between connectors of the first and second coupling part,
   wherein the first coupling part comprises a first connection position configured for reception of the second coupling part,
   wherein the first coupling part comprises a second connection position configured for reception of the second coupling part,
   wherein the first connection position is configured for reception of the second coupling part by insertion along a first axis X1 associated with the first coupling part, and wherein the second connection position is configured for reception of the second coupling part by insertion along a second axis X2 associated with the first coupling part, the second axis X2 being perpendicular to the first axis X1, wherein the connectors of the first and second connector part comprises dot shaped connectors and elongated connectors, wherein one of the first coupling part and the second coupling part comprises the dot shaped connectors, and the other one of the first coupling part and the second coupling part comprises the elongated connectors, wherein connectors of the first coupling part are arranged in a wall section of the first coupling part facing the connectors of the second coupling part when the second coupling part is arranged in the first or second connection position, and wherein each dot shaped connector is associated with a unique one of the elongated connectors, and wherein the connectors are arranged such that each dot shaped connector connects with the unique associated elongated connector in both the first connection position and the second connection position.

2. The electrical coupling according to claim 1, wherein each elongated connector has a straight extension.

3. The electrical coupling according to claim 1, wherein the elongated connectors extend in parallel.

4. The electrical coupling according to claim 1, wherein the first coupling part comprises the elongated connectors which all extend in parallel with either the first axis X1 or the second axis X2.

5. The electrical coupling according to claim 1, wherein the first coupling part comprises the dot shaped connectors.

6. The electrical coupling according to claim 4, wherein the elongated connectors have an extension in parallel with the first axis X1 when the second coupling part is arranged in the first connection position and in parallel with the second axis X2 when the second coupling part is arranged in the second connection position.

7. The electrical coupling according to claim 4, wherein the elongated connectors have an extension perpendicular to the first axis X1 when the second coupling part is arranged in the first connection position and perpendicular to the second axis X2 when the second coupling part is arranged in the second connection position.

8. The electrical coupling according to claim 1, wherein the dot shaped connectors are arranged in an array which in the assembled state of the connector is arranged in 45 degrees to the first axis X1 and the second axis X2.

9. The electrical coupling according to claim 1, wherein each pair of dot shaped connector and associated elongated connector is arranged for one of power, ground and data transfer.

10. The electrical coupling according to claim 1, wherein the dot shaped connectors and associated elongated connectors comprises one pair of connectors arranged for power transfer, which one pair comprises a connector being the last to enter the first connection position or the second connection position when the second coupling part is connected to the first coupling part.

11. The electrical coupling according to claim 1, further comprising a seal enclosing the connectors.

12. The electrical coupling according to claim 1, wherein the dot shaped connectors are spring-loaded pins, such as pogo pins.

13. The electrical coupling according to claim 1, in which the elongated connectors have a non-uniform extension, wherein each elongated connector has a length sufficient for making contact with the associated dot shaped connector in the first connection position and the second connection position.

14. A camera device comprising an electrical coupling for transferring electrical signals between a camera head and a cable, comprising:

a first coupling part associated with the camera head and a second coupling part associated with the cable and connectable to the first coupling part for establishing contact between connectors of the first and second coupling part, wherein the first coupling part comprises a first connection position configured for reception of the second coupling part, wherein the first coupling part comprises a second connection position configured for reception of the second coupling part, wherein the first connection position is configured for reception of the second coupling part by insertion along a first axis X1 associated with the first coupling part, and wherein the second connection position is configured for reception of the second coupling part by insertion along a second axis X2 associated with the first coupling part, the second axis X2 being perpendicular to the first axis X1, wherein the connectors of the first and second connector part comprises dot shaped connectors and elongated connectors, wherein one of the first coupling part and the second coupling part comprises the dot shaped connectors, and the other one of the first coupling part and the second coupling part comprises the elongated connectors, wherein connectors of the first coupling part are arranged in a wall section of the first coupling part facing the connectors of the second coupling part when the second coupling part is arranged in the first or second connection position, and wherein each dot shaped connector is associated with a unique one of the elongated connectors, and wherein the connectors are arranged such that each dot shaped connector connects with the unique associated elongated connector in both the first connection position and the second connection position.

* * * * *